12) United States Patent
Parks

(10) Patent No.: US 6,907,817 B2
(45) Date of Patent: Jun. 21, 2005

(54) LINEAR ACTUATOR

(75) Inventor: Brent Parks, Englewood, CO (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/193,414

(22) Filed: Jul. 11, 2002

(65) Prior Publication Data

US 2004/0006979 A1 Jan. 15, 2004

(51) Int. Cl.7 .................................................. F16J 3/06
(52) U.S. Cl. ................................ 92/35; 92/47; 92/98 D
(58) Field of Search ........................... 92/35, 47, 98 D; 180/271; 280/748, 753

(56) References Cited

U.S. PATENT DOCUMENTS

| 731,354 | A | * | 6/1903 | Fulton ............................. 92/35 |
| 1,986,273 | A | * | 1/1935 | Leffingwell ..................... 92/92 |
| 3,106,131 | A | | 10/1963 | Barr et al. |
| 3,565,398 | A | * | 2/1971 | Floria et al. .................... 92/35 |
| 3,967,707 | A | | 7/1976 | Carlton |
| 4,560,145 | A | * | 12/1985 | Widmer .................. 254/93 HP |
| 4,687,189 | A | * | 8/1987 | Stoll et al. ..................... 269/22 |
| 5,431,087 | A | | 7/1995 | Kambara ...................... 92/146 |
| 5,695,242 | A | * | 12/1997 | Brantman et al. ........... 280/753 |

FOREIGN PATENT DOCUMENTS

| EP | 0 648 941 | 4/1995 |
| EP | 0 940 584 | 3/1998 |
| GB | 2 076 894 | 3/1980 |
| GB | 2 076 894 | 12/1981 |

* cited by examiner

Primary Examiner—Edward K. Look
Assistant Examiner—Michael Leslie
(74) Attorney, Agent, or Firm—Sally J. Brown

(57) ABSTRACT

A linear actuator having a low profile and a long stroke is provided. The actuator includes a housing integrally connected to a telescoping piston. The piston may be extended by a fluid such as inflation gas provided by an inflation gas generator in fluid communication with the piston. The piston extends rapidly through a one-shot stroke. The extending piston converts energy in the fluid into motion for performing linear work. The linear actuator may be formed from a single piece of parent material through stamping processes including deep draw stamping. Alternatively, other metal forming processes may be used to form the linear actuator.

64 Claims, 5 Drawing Sheets

LINEAR ACTUATOR

BACKGROUND OF THE INVENTION

1. The Field of the Invention

The present invention relates to actuators. More specifically, the invention relates to a linear actuator having a low profile and a long stroke.

2. Technical Background

Actuators provide a very flexible and efficient mechanism for converting fluid power into linear or rotary motion. Power may be introduced into the fluid remotely and readily transferred to the actuator through fluid lines or channels. By transmitting power through the fluid, a uniform and constant mechanical motion can be achieved.

While linear actuators include components which move linearly with respect to each other, combining a linear actuator with various gears, hinges, struts, and the like allows nonlinear movement of objects as well. Linear actuators have a broad range of applications. One common example of linear actuators are hydraulic lifts used on heavy equipment.

Generally, a linear actuator includes a power supply, a fluid, a housing, and a piston. Typically, the fluid is a liquid such as hydraulic fluid or a gas such as air. Different fluids transfer the power from the power supply with different characteristics. Selection of the fluid depends largely on the desired application for the linear actuator.

The power supply may be a pump, motor, mechanical lever, or other mechanism for introducing pressure and force into the fluid. Generally, the power supply pressurizes the fluid by adding fluid from a fluid reservoir to a closed system. Alternatively, the power supply may generate additional fluid or excite fluid currently in a closed system.

The housing and piston are coupled such that pressure applied to fluid within the housing causes the piston to extend or retract. The rate at which the fluid is pressurized generally determines the rate the piston moves. The pressurization rate depends largely on the size and capability of the power supply. While the term "piston" is used to describe the member moved by the fluid, the terms piston, ram, and plunger may be used interchangeably depending on the configuration of a particular linear actuator to describe the member which moves like a piston. Generally the term "piston" refers to a member which moves within a housing, however, where the piston and housing are integrated the actuator may be referred to as a piston type actuator. In the specification, in embodiments which integrate the housing and piston, the term "piston" is used for simplicity and clarity.

Linear actuators may be single-acting or double-acting. In a single-acting actuator, the fluid moves the piston within the housing only in one direction. An external force such as gravity returns the piston to a non-extended position. In a double-acting actuator, the fluid is directed such that the fluid may be used both to extend and retract the piston.

Generally, the housing is secured to a stationary member and the piston contacts a moveable member. The piston may or may not be secured to the moveable member. In a single-acting actuator, fluid pressurized within the housing behind the piston extends the piston linearly from the housing.

Unfortunately, linear actuators have limitations. Specifically, most linear actuators are limited to a stroke length less than the length of the housing. Stroke length (also referred to herein as stroke) is the linear distance the piston travels from a fully retracted position to a fully extended position. To operate, generally the housing is a closed system containing the fluid and piston. The housing is at least as long as the piston. The piston retracts within the housing but does not extend beyond the walls of the housing. Therefore, the maximum piston stroke is shorter than the housing length.

To address the limited stroke, telescoping pistons have been developed which include a plurality of stages. The stages are sized and configured to slide within each other like in a telescope. Telescoping stages use the space within the housing more efficiently and allow a stroke which is longer than the housing.

However, telescoping stages generally include separate pieces connected by seals. The seals allow the stages to slide past each other in response to the fluid pressure. Friction between the stages and seals causes the seals to quickly wear. Worn seals may cause fluid to leak between stages. Thus, linear actuators having seals require periodic maintenance.

In addition, separate telescoping stages increase the assembly and production costs for the telescoping pistons. Each stage and seal is a different diameter. Thus, each stage and seal are produced separately and assembled to make the telescoping piston.

Single-acting telescoping actuators may be used for various applications. For example, a single-acting telescoping actuator works well to raise a dump truck bed for dumping a load. However, the potential for leaks, cost of production and assembly, weight, rate of deployment and size may limit the applications of single-acting telescoping actuators.

For example, to use linear actuators in vehicles in some applications, the linear actuators should be inexpensive, light weight, and reliable. A very compact linear actuator having a long stroke may be required. A long stroke generally means the stroke is longer than the length, or profile, of the actuator housing before the piston deploys. In certain applications, linear actuators may be required to deploy very rapidly.

While reciprocating linear actuators may be preferable in certain applications in a vehicle such as a brake system. Other linear actuators may only require a single reliable deployment of the piston. These types of linear actuators may be referred to as "one-shot" linear actuators. For example, components designed to protect and aid an occupant during an emergency may use "one-shot" linear actuators. Unfortunately, conventional single-acting linear actuators have been unable to meet the size, weight, reliability, rapid deployment, low profile and long stroke, and cost requirements for use in vehicle safety systems.

Accordingly, it would be an advancement in the art to provide a linear actuator which is compact having a minimal profile and a long stroke for use with a variety of vehicle safety systems. It would be a further advancement to provide a linear actuator that will rapidly and reliably deploy. It would be another advancement in the art to provide a linear actuator that is inexpensive to fabricate compared to conventional linear actuators. Additionally, it would be an advancement to provide a linear actuator that is light weight and self-contained having no external reservoir. It would be another advancement in the art to provide a linear actuator which is leak proof and requires no maintenance. The present invention provides these advancements in a novel and useful way.

BRIEF SUMMARY OF THE INVENTION

The apparatus of the present invention has been developed in response to the present state of the art, and in particular, in response to the problems and needs in the art that have not yet been fully solved by current linear actuators. Thus, the present invention provides a single-acting linear actuator which has a small profile but a long stroke, is inexpensive, light weight, reliable, maintenance free, self-contained, and deploys very rapidly.

In one embodiment, the linear actuator includes a wall having a first end and a second end. The wall circumscribes a longitudinal axis. A single-acting piston is connected to the first end of the wall. The piston extends along the axis such that the top of the piston is substantially coplanar with the first end. Alternatively, the top of the piston may be positioned substantially between the first and second ends. The piston and wall may be integrally formed from a single piece of malleable material.

In certain embodiments, a fluid generator may be connected to the second end. The fluid generator provides pressurized fluid to extend the piston. The fluid generator may be an inflation gas generator which is activated by an initiator. For example, the inflation gas generator may be a micro-gas generator (MGG). The fluid generator may be sealed to a lip extending from the second end of the wall. Furthermore, the piston may be integrated with the first end to form a closed system. Fluid is prevented from passing the first end.

The piston may have a stroke which is at least as long as the axial length of the wall. In certain embodiments, the piston includes a plurality of piston stages which deploy in succession when a pressurized fluid is applied from the second end toward the first end. A piston which has a plurality of piston stages may have a long stroke.

In certain embodiments, an activation signal activates the linear actuator. The activation signal is sent to an initiator which activates an inflation gas generator to produce pressurized inflation gas. The pressurized inflation gas builds between the gas generator and the piston until the piston telescopically deploys in a one-shot single-action stroke.

In an alternative embodiment, the linear actuator includes a cylindrical wall with a first end, second end, and a central axis. A cylindrical piston stage is coaxial with the wall and connected to the first end. The cylindrical piston stage is positioned between the first and second ends of the cylindrical wall. A piston head is connected to the piston stage and coaxial with the central axis.

Preferably, the linear actuator includes a plurality of interconnected piston stages connecting the first end to the piston head. The interconnected piston stages may seal the linear actuator to retain the fluid behind the piston. The piston head, plurality of piston stages and first end of the wall may be telescopically interconnected such that the wall encircles the plurality of piston stages and the piston head.

In an alternative embodiment, a fluid generator may be sealed to the second end. The fluid generator generates fluid which applies pressure to the piston stages and piston head. Preferably, the piston stages and piston head deploy telescopically along the central axis for a stroke greater than the axial length of the cylindrical wall.

In a preferred embodiment, the wall, piston head and piston stages are integrally formed from a single piece of malleable parent material. The material may be brass, steel, or other materials. Preferably, the parent material is deep draw stamped to form the wall, piston head and piston stages using conventional deep draw stamping techniques.

The present invention may be manufactured using a variety of manufacturing processes. The linear actuator may be formed from rolled tubing material. In one embodiment, the linear actuator may be formed using less conventional methods such as deep drilling, hydroforming, flowforming, or other metal forming processes. Generally, the manufacturing process used to form the linear actuator is closely related to the intended application for the linear actuator.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages of the invention are obtained and may be readily understood, a more particular description of the invention briefly described above will be rendered by reference to specific embodiments thereof which are illustrated in the appended drawings. Understanding that these drawings depict only typical embodiments of the invention, and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention can be better understood with reference to the drawings where like parts are designated with like numerals throughout.

Figure 1A:
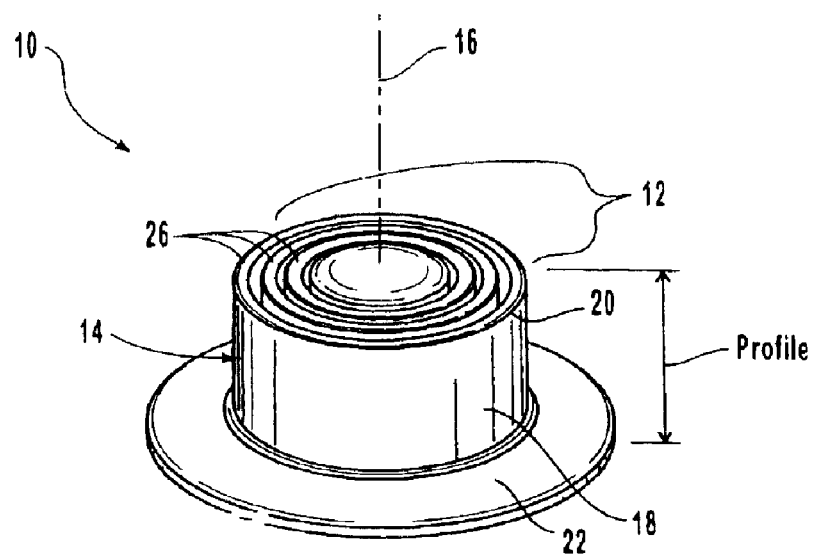
FIG. 1A is a perspective side view illustrating an integrated piston and housing prior to deployment.

FIG. 1A illustrates one embodiment of a linear actuator 10 prior to deployment. The linear actuator 10 includes a piston 12 and housing 14. In a preferred embodiment, the housing 14 and piston 12 are integrated in a single piece. The piston 12 and housing 14 share a common longitudinal axis 16. The housing 14 includes a wall 18 which circumscribes the axis 16. The wall 18 encircles the piston 12 when the linear actuator 10 is not deployed. Preferably, the wall 18 runs parallel to the axis 16.

The wall 18 has a first end 20 and a second end 22. The second end 22 may be connected to a power source (not shown in FIG. 1A). Preferably, the first end 20 is integrated with the piston 12. Alternatively, the first end 20 may be connected to the piston 12. The first end 20 and piston 12 are joined such that fluid is unable to pass by the first end 20.

Preferably, the piston 12 is a single-acting piston, meaning the piston 12 is extended only in one direction by a fluid. Pressurized fluid is not used to return the piston 12 to an initial unextended position. In a preferred embodiment, the piston 12 may include piston stages 26, also referred to as convolutions, within an area substantially circumscribed by the wall 18. Preferably, the piston stages 26 are coaxial with the axis 16. The piston 12 is positioned within the wall 18 such that the top of the piston 12 is coplanar with the first end 20. Alternatively, the top of the piston 12 lies substantially between the first end 20 and second end 22 of the wall 18. Furthermore, the top of the piston 12 may be positioned at any point along the longitudinal axis 16.

In the illustrated embodiment, the wall 18 and piston stages 26 are cylindrically shaped. However, it is readily understood that the wall 18 and/or the piston stages 26 may be of a variety of shapes all within the scope of the present invention. For example, the wall 18 may circumscribe the axis 16 in an oval or rectangular shape. Furthermore, the piston stages 26 may have a square, rectangle or triangular cross-section.

Figure 1B:
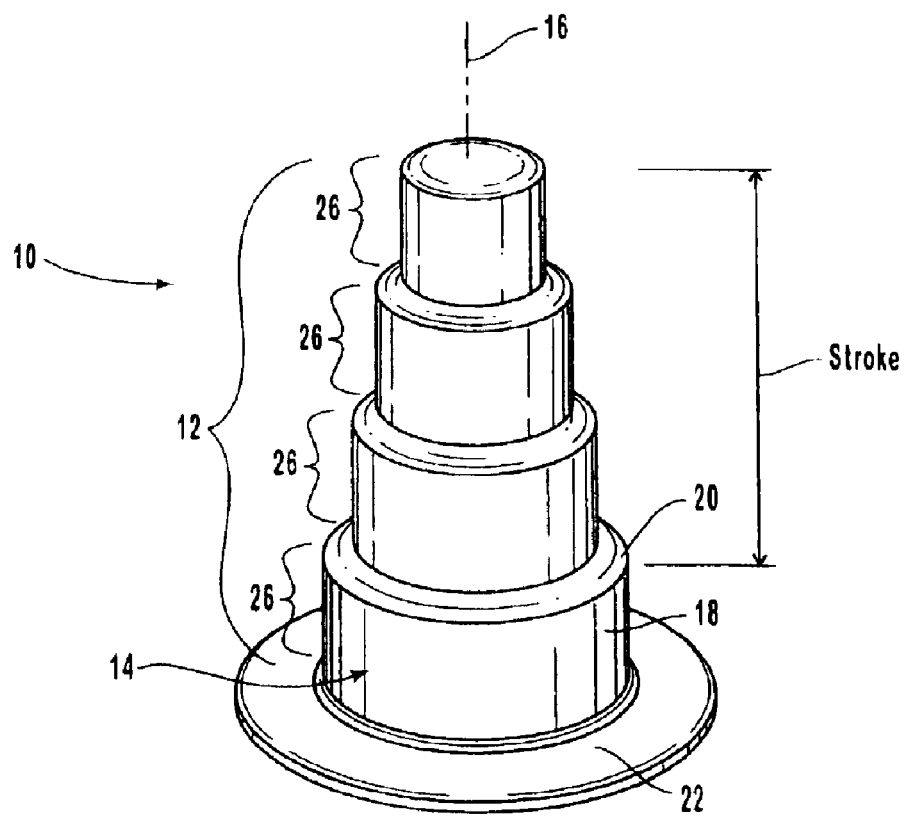
FIG. 1B is a perspective side view illustrating an integrated piston and housing which is deployed.

Referring now to FIG. 1B, a deployed linear actuator 10 is illustrated. The piston stages 26 move to an extended configuration which extends the piston 12. A power source (not shown in FIG. 1B) may be connected in fluid communication with the piston 12 at the second end 22. To deploy the actuator 10, a pressurized fluid is forced against the piston 12 in the direction of the first end 20. The fluid causes the piston stages 26 to extend in succession along the axis 16 and away from the wall 18.

Preferably, the wall 18 and piston stages 26 are formed from a single durable, rigid and malleable piece of material such as metal. The metal may be brass, cold rolled steel, stainless steel, or the like. Of course, other materials such as polymers may also be used. The material thickness may vary depending on the intended application. Similarly, other properties such as diameters, depth of draws, and the like may vary depending on the intended application. Generally, the material has deep draw characteristics and is strong enough to maintain the integrity of the piston 12 and wall 18 when the piston 12 is deployed by pressurized fluid such as inflation gas.

Preferably, the integrated wall 18 and piston 12 are formed from a blank (not shown) using a deep draw stamping process. Generally, an object is deep drawn if its depth is greater than half its diameter. The deep draw stamping process may be used to form the most inner piston stage 26 first. Then, each successively larger diameter piston stage 26 may be stamped until the desired number of stages 26 and wall 18 have been formed. Of course, other stamping processes may be used within the scope of the present invention to form the concentric piston stages 26.

Linear actuators 10 formed by stamping provide piston stages 26 which are interconnected to form a closed system. The piston stages 26 deploy telescopically. When the fluid presses from the second end 22 against the piston 12, each inner stage 26 unfolds and moves past the next outer stage 26 until all the stages 26 have extended. The number of piston stages 26 which deploy and the distance each extends depends on the amount of pressure provided by the fluid. Preferably, the fluid pressure is sufficient to fully extend each piston stage 26.

Referring generally now to FIGS. 1A and 1B, the linear actuator 10 provides an actuator having a small profile and a long stroke. As seen in FIG. 1A, the profile is the axial length of the wall 18, or the distance from the first end 20 to the second end 22 measured parallel to the longitudinal axis 16. FIG. 1B illustrates the stroke. The stroke is the distance from the first end 20 to a point along the longitudinal axis 16 where the piston 12 reaches its maximum extension. A long stroke means the stroke is longer than the length, or profile, of the actuator 10 before the piston 12 deploys. With a long stroke and low profile, the linear actuator 10 may provide an operable stroke for a given application and still may be stored in a compact space. Preferably, the stroke is greater than the axial length of the wall 18, the profile. Alternatively, the stroke is at least as long as the profile.

Figure 2:
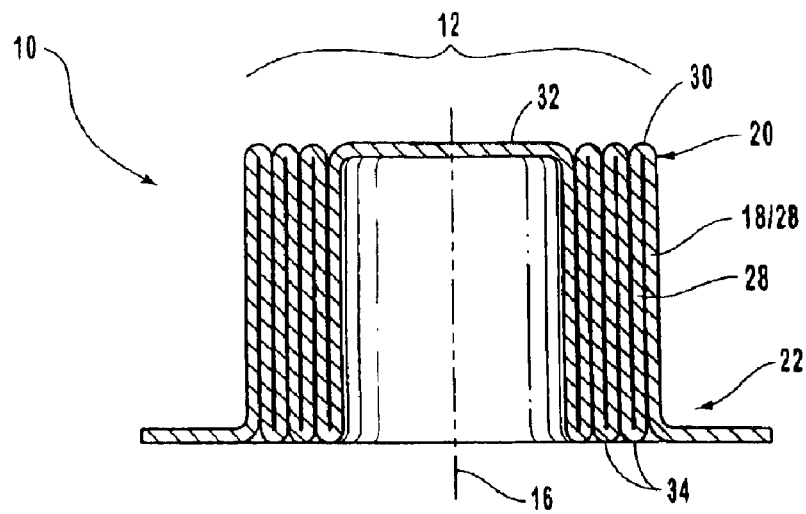
FIG. 2 is a cross-section view illustrating an integrated piston head, plurality of piston stages and wall.

FIG. 2 illustrates a cross-section view of a linear actuator 10. Each piston stage 26 (See FIG. 1B) includes two wall lengths 28 joined by an external fold 30. Note that wall lengths 28 and an external fold 30 are labeled in FIG. 2 for the outer most piston stage 26. The inner piston stages 26 include wall lengths 28 and external folds 30 as well but are not all labeled to provide clarity in understanding the present invention.

The outer most piston stage 26 has a first wall length 28 which also serves as the wall 18 for the actuator 10. The external fold 30 joins two wall lengths 28. Preferably, the external fold 30 causes the lengths 28 to abut each other. The lengths 28 preferably run parallel to the longitudinal axis 16. Alternatively, the lengths 28 may be joined at the external fold 30 to form an angle from about zero degrees to about ninety degrees.

Generally, the linear actuator 10 includes a piston head 32 with a plurality of piston stages 26 between the piston head 32 and the first end 20 of the wall 18. Alternatively, a single piston stage 26 may form the piston 12. In another alternative, a single piston stage 26 may connect a wall 18 and a piston head 32.

Preferably, each inner piston stage 26 has a diameter which is smaller than the next successive outer piston stage 26. The piston stages 26 are interconnected by an internal fold 34. An internal fold 34 is a fold on the inside of the integrated piston 12 and wall 18. The internal fold 34 marks the transition from an outer piston stage 34 to an inner piston stage 34 having a smaller diameter. Preferably, the internal folds 34, like the external folds 30, join two wall lengths 28 such that the lengths 28 abut each other and run parallel to the longitudinal axis 16.

Conventional telescoping linear actuators generally include seals to provide an operable transition between an outer and inner piston stage. However, these seals typically wear and leak fluid. In contrast, the internal folds 34, external folds 30, and wall lengths 28 of the present invention telescopically interconnect the wall 18, piston stage(s) 26 and piston head 32 without seals and contain the fluid within the piston 12.

Preferably, the piston head 32 is integrally connected to the inner most piston stage 26 by an inner fold 34. Generally, the piston head 32 is coaxial with the longitudinal axis 16 and piston stages 26. The piston head 32 may be characterized as the inner most piston stage 26. Generally, the piston head 32 impinges an object the linear actuator 10 is installed to move. The piston head 32 may be attached to the object or simply impinge a slot or cup of the object sized to receive the piston head 32. The piston head 32 extends along the axis 16 traveling the length of the stroke.

Preferably, the piston head 32 is positioned to be coplanar, or in line, with the first end 20 of the wall 18. Alternatively, a portion of the head 32 may extend past the first end 20. In yet another alternative, the head 32 may be positioned substantially between the first end 20 and the second end 22.

In the depicted embodiment, the wall 18 encircles the piston head 32 and a plurality of piston stages 26. Generally, the linear actuator 10 is sealed in fluid communication with a supply of pressurized fluid. Preferably, the pressurized fluid enters from the second end 22 and causes the piston head 32 and piston stages 26 to extend axially like a telescope. The piston head 32 and inner piston stages 26 slide past the outer piston stages 26.

Given sufficient fluid pressure, each piston stage 26 unfolds at the external fold 30 such that the two wall lengths 28 form a substantially flat length. As each piston stage 26 is fully extended, each internal fold 34 also unfolds to connect an inner and an outer piston stage 26. Preferably, the extension of each piston stage 26 causes the piston head 32 to travel through a stroke greater than the axial length of the wall 18.

Figure 3:
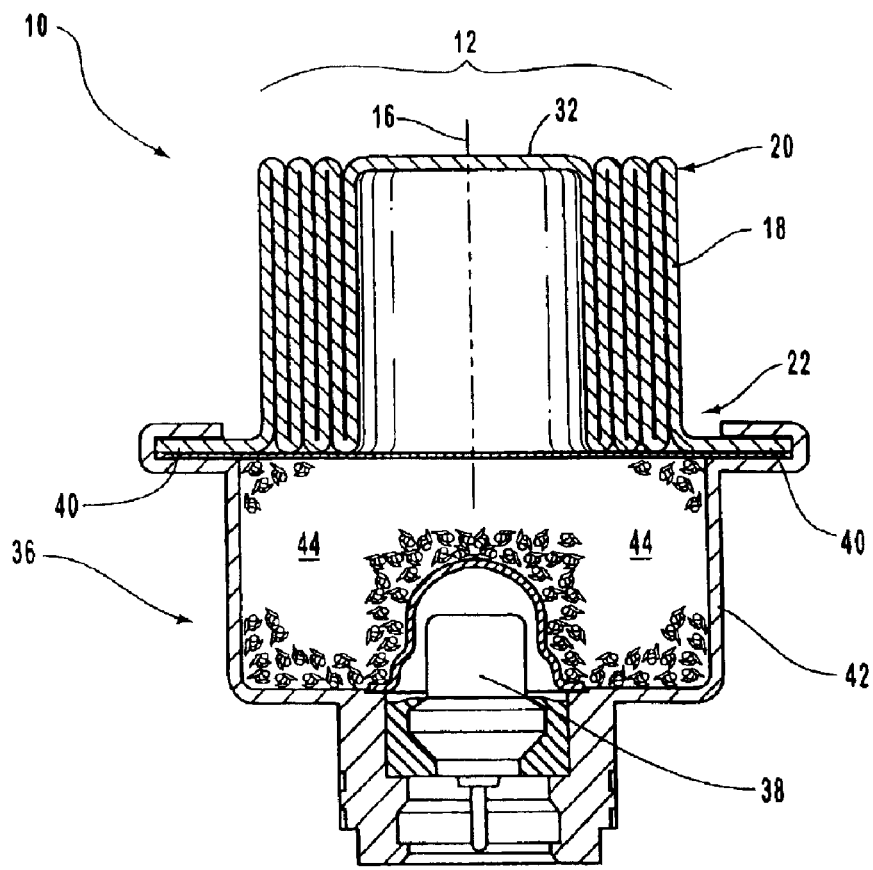
FIG. 3 is a cross-section view illustrating an integrated piston and housing connected to a gas generator which provides pressurized gas to deploy the piston.

FIG. 3 illustrates a linear actuator 10 including a pressurized fluid generator 36, and an initiator 38. In certain embodiments, the fluid generator 36 is a micro-gas generator. Alternatively, the fluid generator 36 is a conventional airbag inflator adapted for use in a linear actuator 10. Linear actuators 10 which include such fluid generators 36 may be referred to as pyrotechnic linear actuators 10.

The fluid generator 36 generates sufficient pressurized inflation gas to extend the piston 12 through a stroke of desirable length. Preferably, the fluid generator 36 is sealed to the second end 22 by an extending lip 40. The fluid generator 36 may be sealed to the lip 40 by crimping, welding, riveting, and other conventional sealing techniques.

In one embodiment, the fluid generator 36 comprises a housing 42 containing gas generant 44. The housing 42 is connected to an initiator 38. The initiator 38 activates the gas generant 44 which produces pressurized inflation gas.

The initiator 38 receives an activation signal from a sensor (not shown). The sensor detects a condition requiring activation of the linear actuator 10. For example, the sensor may detect that a vehicle is in a roll-over accident. An activation signal is sent to the initiator 38 which activates the gas generant 44. The gas generant 44 produces pressurized inflation gas which pushes against the piston 12. The amount of pressurized inflation gas provided depends on the application for the linear actuator 10. Preferably, the pressure of the inflation gas is sufficient to extend each piston stage 26 telescopically to move the piston 12 through a single-acting stroke. Thus, an object abutting or connected to the piston 12 is also moved.

Conventional linear actuators, using for example hydraulic fluid, generally deploy slowly because the driving pumps and motors pressurize the fluid slowly. As the pressure builds, the piston is extended. Together, the sensor, initiator 38 and fluid generator 36 of the present invention are capable of producing pressurized inflation gas very rapidly. These components are capable of deploying the linear actuator 10 through a single-acting stroke in about 40 milliseconds or less depending on the desired deployment speed.

Figure 4A:
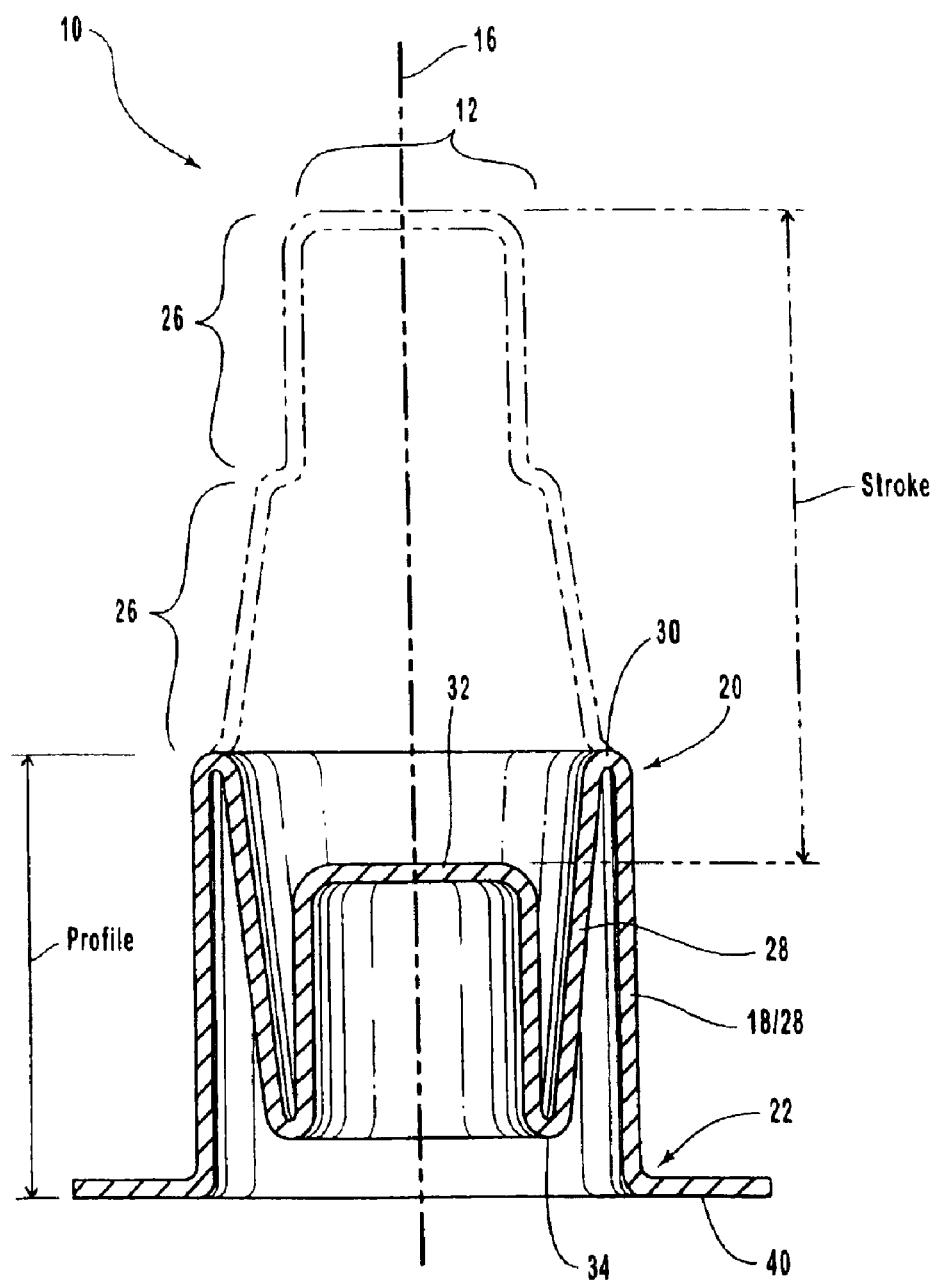
FIG. 4A is a cross-section view illustrating an alternative embodiment of an integrated piston head, piston stage and wall.
Figure 4B:
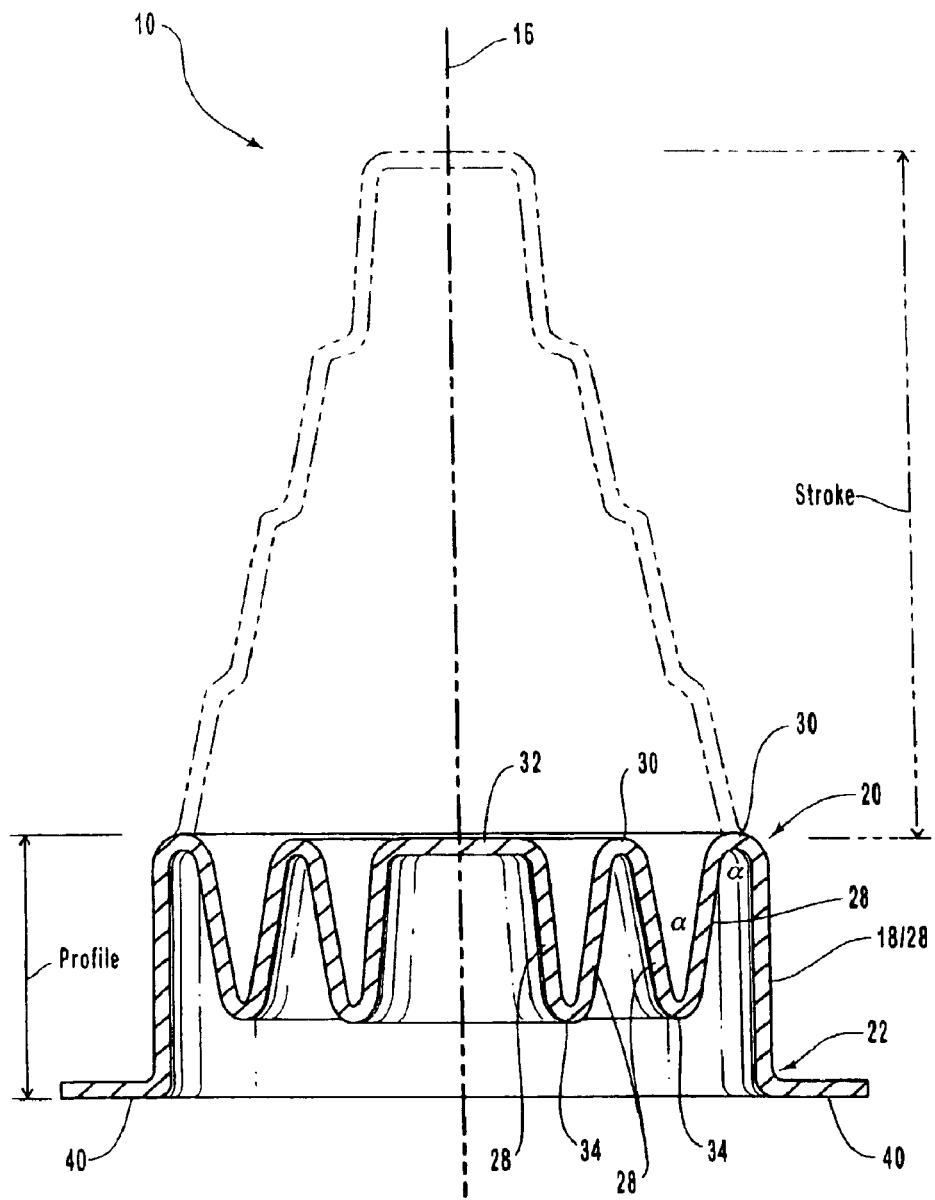
FIG. 4B is a cross-section view illustrating another alternative embodiment of an integrated piston head, plurality of piston stages and wall.

Referring now to FIGS. 4A and 4B, alternative embodiments of the present invention are illustrated in cross-section. In FIG. 4A, a piston head 32 is joined by an internal fold 34 to a single stage 26 including wall 18, 28, an external fold 30, and wall length 28. In this embodiment, the wall length 28 and wall 18, 28 are not parallel. In addition, the piston head 32 is positioned along the axis 16 such that the piston head 32 is substantially between the first end 20 and the second end 22. Preferably, the piston head 32 may be positioned at any point between the first and second ends 20, 22. In this manner, the profile does not extend beyond the axial length of the wall 18.

FIG. 4A also illustrates in phantom the cross-section configuration of the linear actuator 10 when the piston stages 26 are fully extended. The illustrated stroke and profile lengths indicate the long stroke attainable even with a comparatively low profile. The positioning of the piston head 32 along the axis 16 directly affects the length of the stroke. If the piston head 32 is positioned substantially between the first end 20 and second end 22 and sufficient fluid force is applied, the stroke will be at least as long as the axial length of the wall 18 and preferably longer.

The phantom outline also illustrates how the wall lengths 28, piston head 32, internal fold 34, and external fold 30 extend to provide a telescoping single-acting piston 12. As mentioned above, the piston stages 26 essentially unfold due to the pressure of the fluid. Preferably, the fluid remains contained within the piston 12. Alternatively, the piston 12 may include an opening which releases the fluid.

FIG. 4B illustrates yet another alternative embodiment for the linear actuator 10. Again, the phantom cross-section illustrates the position of the components when the piston 12 is fully extended. In this embodiment, the wall lengths 28 do not abut each other or lie parallel to the wall 18. Instead, the internal folds 34 and external folds 30 position the wall lengths 28 to form an angle $\alpha$ of about thirty degrees. Preferably, prior to activation of the actuator 10, the piston head 32 is coplanar with the first end 20.

Referring generally to FIGS. 1A–4B, embodiments of the present invention provide a linear actuator 10 which is self-contained. The fluid may originate and remain within the actuator 10. The fluid does not leak and the inflation gas generator 36 is adapted from proven airbag inflator technology so the actuator 10 requires no maintenance and reliably deploys the piston 12 very quickly.

Preferably, the linear actuator 10 is formed by stamping a single piece of parent material into the integrated housing 14 and piston 12. The linear actuator 10 includes fewer parts which reduces assembly and production costs. The configuration of the integrated housing 14 and piston 12 provides a linear actuator 10 having a minimal profile and a long stroke. Because few parts are used and the fluid is inflation gas, the linear actuator 10 is also very light weight.

The features of the present invention allow for its use in a variety of applications. Preferably, linear actuators 10 within the scope of the present invention are used in vehicle safety systems. Generally, vehicle components should be light weight, reliable, compact, self-contained, inexpensive, and require minimal maintenance. Vehicle safety systems generally include the requirement that the safety components activate and respond very quickly.

Figure 5:
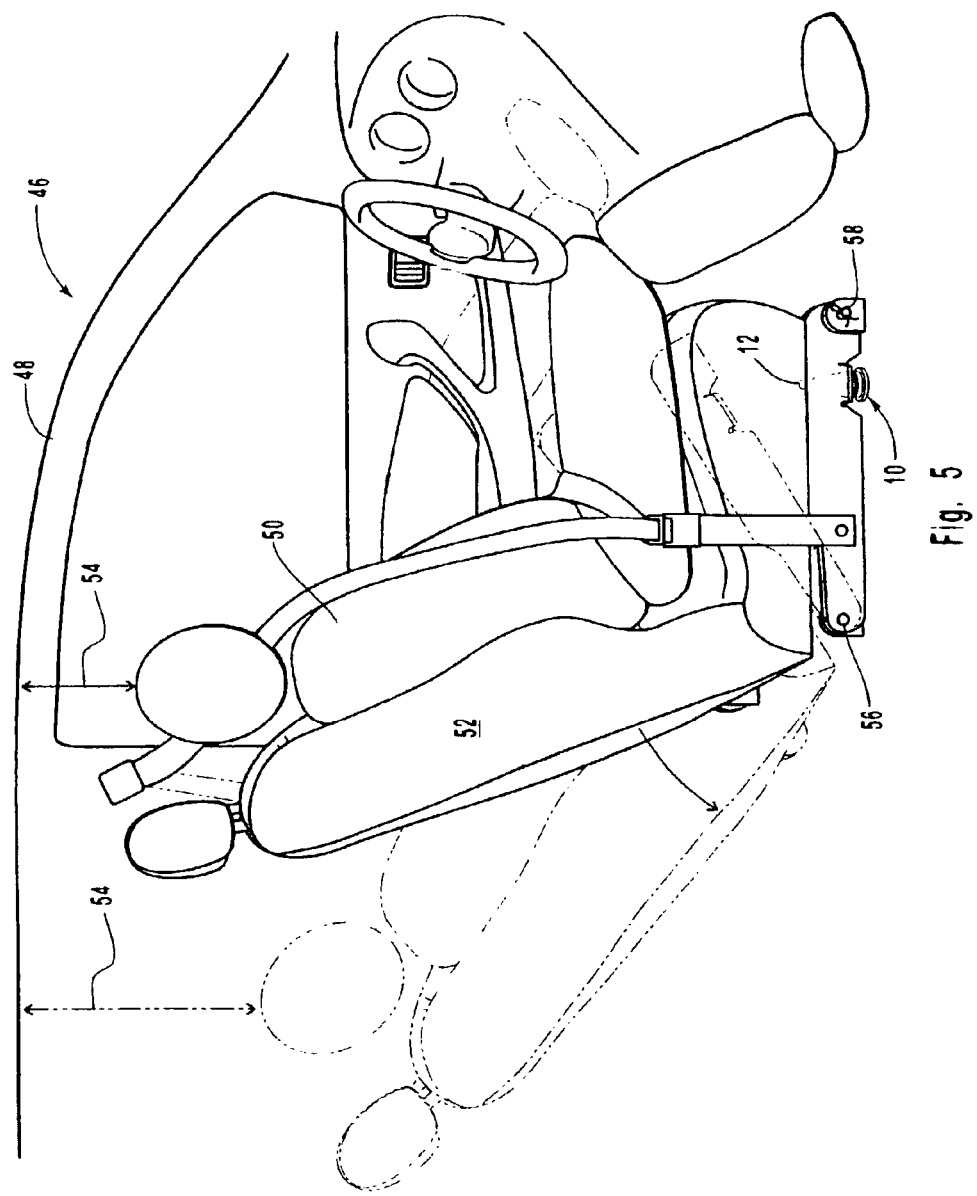
FIG. 5 is a perspective side view illustrating one embodiment of the present invention implemented with a vehicle safety system.

FIG. 5 illustrates a vehicle safety system 46 which includes a linear actuator 10 according to the present invention. Of course, the system 46 is one of many in which the present invention may be utilized. For example, linear telescoping actuators 10 may be used in a recess of a door. Manual operation of the linear telescoping actuator 10 may provide an exit from a jammed door. The system 46 is designed to protect an occupant during a roll-over accident.

During a roll-over, the roof 48 generally withstands the roll-over without encroaching on the vehicle interior. However, depending on the size of an occupant 50 and configuration of the seat 52, an occupant's head may be thrown against the roof 48 during the roll-over. The system 46 seeks to prevent or minimize these head injuries.

When a roll-over accident is detected, the system 46 forces the occupant's seat 52 to rotate backwards. Doing so provides a greater clearance 54 between an occupant's head and the roof 48 which minimizes head injuries.

The system 46 includes a seat 52 with a pivot point 56 substantially at the rear of the seat 52. The seat 52 rotates about the pivot point 56 to increase the clearance 54. The seat 52 is rotated by a linear actuator 10 positioned under the seat frame and substantially at the front of the seat 52. The linear actuator 10 includes a fluid generator 36 sealed to the second end 22. Preferably, a pivot point 56 and linear actuator 10 are included on each side of the seat 52.

The linear actuator 10 should provide a long stroke to move the front of the seat 52 the distance needed to pivot and provide the increased clearance 54. Generally, the space between the seat frame and the vehicle floor is limited. Therefore, the profile of the linear actuator 10 should be minimized. The linear actuator 10 should also provide sufficient power to move the seat 52 and occupant 50 an operable distance. Certain embodiments of the present invention provide a long stroke, a minimal profile, and the required power.

FIG. 5 also illustrates in phantom the new position of the occupant 50 and seat 52 when the system 46 is activated. The system 46 may include one or more sensors (not shown) which send signals to an electronic control unit (ECU) (not shown). The ECU determines when a roll-over occurs.

The ECU sends an activation signal to the initiator 38. The activation signal may be sent to a plurality linear actuators 10. As discussed above, the initiator 38 activates the fluid generator 36 which provides pressurized inflation gas to telescopically extend the piston 12. The extending piston 12 moves the front edge of the seat frame up. The seat 52 pivots at the pivot point 56 and greater clearance 54 is provided between the occupant's head and the roof 48.

In one configuration, the seat 52 may include shear pins 58 which are severed by the sudden forceful movement of the front of the seat 52. The shear pins 58 prevent the seat 52 from pivoting until a roll-over accident is detected.

In summary, an inexpensive, light weight, self-contained, linear actuator 10 having a low profile and a long stroke is provided. The linear actuator 10 may be adapted in different embodiments to provide a one-shot single-acting actuator 10 which deploys very rapidly. "One-shot" means the actuator 10 may be used once, after which the actuator 10 may need to be replaced. The linear actuator 10 also deploys with sufficient power to impart the necessary motion. Preferably, the linear actuator 10 is used in a vehicle safety system to increase protection available to vehicle occupants.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by Letters Patent is:

1. A linear actuator having a longitudinal axis comprising:
   a wall having a first end, the wall circumscribing the axis;
   a fluid generator connected to a second end of the wall; and
   a single-acting piston connected to the first end, such that the top of the piston is positioned along the longitudinal axis, wherein the piston comprises a plurality of piston stages deployable in succession when a pressurized fluid is applied from the second end of the wall.

2. The linear actuator of claim 1, wherein the fluid generator is sealed to a lip extending from the second end of the wall.

3. The linear actuator of claim 1, wherein the wall and piston are integrally formed from a single piece of malleable material.

4. The linear actuator of claim 1, wherein the wall and piston are made from a malleable material.

5. The linear actuator of claim 1, wherein the wall and piston are made from a rigid material.

6. The linear actuator of claim 1, wherein the wall and piston are made from plastic.

7. The linear actuator of claim 1, wherein the wall and piston are made from metal.

8. The linear actuator of claim 1, wherein the piston has a stroke of at least the axial length of the wall.

9. The linear actuator of claim 1, wherein the piston is integrated with the first end preventing passage of fluid by the first end.

10. The linear actuator of claim 1, wherein the top of the piston is positioned along the axis substantially coplanar with the first end.

11. A linear actuator comprising:
    a cylindrical wall having a first end, a second end, and a central axis;
    a fluid generator connected to the second end of the cylindrical wall;
    a piston head;
    and a plurality of interconnected cylindrical piston stages connecting the first end and the piston head.

12. The linear actuator of claim 11, wherein the first end of the wall, piston head and piston stages are telescopically interconnected.

13. The linear actuator of claim 12, wherein the wall encircles the piston head and piston stages.

14. The linear actuator of claim 13, wherein the first end of the wall, piston head and piston stages are interconnected to prevent passage of fluid.

15. The linear actuator of claim 14, further comprising a fluid generator sealed to the second end.

16. The linear actuator of claim 15, wherein the piston head and piston stages deploy telescopically in response to pressurized fluid supplied by the fluid generator.

17. The linear actuator of claim 16, wherein the piston head and piston stages deploy along the central axis through a stroke greater than the axial length of the wall.

18. The linear actuator of claim 17, wherein the wall, piston head and piston stages are integrally formed from a single piece of malleable material.

19. A linear actuator comprising:
    a cylindrical wall having a first end, a second end, and a central axis;
    a cylindrical piston connected to the first end and encircled by the wall;
    an inflation gas generator sealed to the second end;
    an initiator connected to the generator;
    wherein the piston comprises a piston head and a plurality of piston stages which are telescopically interconnected such that the piston head and piston stages are positioned substantially between the first end and the inflation gas generator prior to deployment of the linear actuator.

20. The linear actuator of claim 19, wherein the inflation gas generator comprises a micro-gas generator.

21. The linear actuator of claim 19, wherein the stroke of the deployed piston is greater than the axial length of the wall.

22. The linear actuator of claim 19, wherein the piston is connected to the first end of the wall to prevent passage of inflation gas.

23. The linear actuator of claim 19, wherein in response to an activation signal, the initiator activates the inflation gas generator which produces pressurized inflation gas, the inflation gas causing the piston to telescopically deploy completing a single-acting stroke.

24. A linear actuator having a longitudinal axis comprising:
a wall having a first end, the wall circumscribing the axis;
a fluid generator connected to a second end of the wall; and
a single-acting piston connected to the first end, such that the top of the piston is positioned along the axis, the piston comprising a plurality of piston stages deployable in succession when a pressurized fluid is applied from the second end of the wall.

25. The linear actuator of claim 24, wherein the first end of the wall, piston and piston stages are telescopically interconnected.

26. The linear actuator of claim 25, wherein the wall encircles the piston stages.

27. The linear actuator of claim 26, wherein the first end of the wall, piston and piston stages are interconnected to prevent passage of fluid.

28. The linear actuator of claim 27, wherein the fluid generator is sealed to the second end of the wall.

29. An actuator comprising:
a housing comprising a wall that has a first end and a second end;
a piston positioned inside the housing, the piston comprising a plurality of interconnected piston stages deployable in succession;
an expandable fold added to the wall; and
a fluid generator connected to the second end, wherein the actuator is constructed such that actuation of the fluid generator releases a pressurized fluid that expands the fold and extends the piston.

30. An actuator as in claim 29 wherein the wall is integral with the piston.

31. An actuator as in claim 29 wherein the wall and the piston are integrally formed from a malleable material.

32. An actuator as in claim 29 wherein the fluid generator is sealed to a lip extending from the second end of the wall.

33. An actuator as in claim 29 wherein the piston is integrated with the first end.

34. An actuator as in claim 29 wherein the top of the piston is coplanar with the first end.

35. An actuator as in claim 29 wherein the fold is an external fold.

36. An actuator as in claim 29 wherein the piston stages are coaxial with the wall and are positioned substantially between the first end and the second end.

37. An actuator as in claim 36 wherein the piston stages connect the first end to a piston head.

38. An actuator as in claim 37 wherein the first end, the piston bead, and the piston stages are telescopically interconnected.

39. An actuator as in claim 37 wherein the piston stages are interconnected via an internal fold.

40. An actuator as in claim 37 wherein the piston head is integrally connected to the inner most piston stage by an inner fold.

41. An actuator as in claim 37 wherein the piston head and the piston stages deploy telescopically when the fluid generator releases the pressurized fluid.

42. An actuator as in claim 37 wherein the wall encircles the piston stages and the piston head.

43. An actuator as in claim 29 wherein the fluid generator comprises an initiator and a gas generant.

44. An actuator as in claim 29 wherein the fold forms an angle that is between about 0 degrees to about 30 degrees.

45. An actuator comprising:
a housing comprising a cylindrical wall, the wall having a first end and a second end;
a piston positioned inside the housing, the piston comprising a plurality of piston stages, at least one piston stage being coaxial with the wall and positioned substantially between the first end and the second end;
a piston head that is connected to a piston stage;
an expandable fold added to the wall; and
a fluid generator connected to the second end, wherein the actuator is constructed such that actuation of the fluid generator releases a pressurized fluid that expands the fold and extends the piston.

46. An actuator as in claim 45 wherein the release of the pressurized fluid extends the piston stage.

47. An actuator as in claim 45 wherein the wall is integral with the piston.

48. An actuator as in claim 45 wherein the piston stages are interconnected via an internal fold.

49. An actuator as in claim 45 wherein the piston head is integrally connected to the inner most piston stage by an inner fold.

50. An actuator as in claim 45 wherein the piston head and the piston stages deploy telescopically when the fluid generator releases the pressurized fluid.

51. An actuator as in claim 50 further comprising a piston head, wherein the first end, the piston head, and the piston stages are telescopically interconnected.

52. An actuator as in claim 50 wherein the wall encircles the piston stages and the piston head.

53. A linear actuator having a longitudinal axis comprising:
a wall having a first end, the wall circumscribing the axis;
a single-acting piston connected to the first end, such that the top of the piston is positioned along the longitudinal axis;
a fluid generator that is sealed to a lip extending from a second end of the wall;
wherein the piston comprises a plurality of piston stages deployable in succession when a pressurized fluid is applied from the second end of the wall.

54. The linear actuator of claim 53, wherein the fluid generator is connected to the second end of the wall.

55. The linear actuator of claim 53, wherein the wall and piston are made from a rigid material.

56. The linear actuator of claim 53, wherein the piston has a stroke of at least the axial length of the wall.

57. The linear actuator of claim 53, wherein the piston is integrated with the first end preventing passage of fluid by the first end.

58. The linear actuator of claim 53, wherein the top of the piston is positioned along the axis substantially coplanar with the first end.

59. A linear actuator having a longitudinal axis comprising:
a wall having a first end, the wall circumscribing the axis;
a single-acting piston connected to the first end, such that the top of the piston is positioned along the longitudinal axis, wherein the wall and piston are made from metal; and
a fluid generator that is sealed to a lip extending from a second end of the wall.

60. The linear actuator of claim 59, wherein the fluid generator connected to the second end of the wall.

61. The linear actuator of claim 60, wherein the piston comprises a plurality of piston stages deployable in succession when a pressurized fluid is applied from the second end of the wall.

62. The linear actuator of claim 59, wherein the piston has a stroke of at least the axial length of the wall.

63. The linear actuator of claim 59, wherein the piston is integrated with the first end preventing passage of fluid by the first end.

64. The linear actuator of claim 59, wherein the top of the piston is positioned along the axis substantially coplanar with the first end.

\* \* \* \* \*